US011535525B2

(12) United States Patent
Daemen et al.

(10) Patent No.: US 11,535,525 B2
(45) Date of Patent: Dec. 27, 2022

(54) RAPID PYROLYSIS TO FORM SUPER IONIC CONDUCTING LITHIUM GARNETS

(71) Applicant: UT-Battelle, LLC, Oak Ridge, TN (US)

(72) Inventors: Luc L. Daemen, Oak Ridge, TN (US); Robert L. Sacci, Oak Ridge, TN (US); Beth L. Armstrong, Oak Ridge, TN (US); Nathan Kidder, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 80 days.

(21) Appl. No.: 17/157,286

(22) Filed: Jan. 25, 2021

(65) Prior Publication Data

US 2021/0253440 A1 Aug. 19, 2021

Related U.S. Application Data

(60) Provisional application No. 62/965,313, filed on Jan. 24, 2020.

(51) Int. Cl.
*H01B 1/08* (2006.01)
*H01M 10/05* (2010.01)
(Continued)

(52) U.S. Cl.
CPC .............. *C01G 25/02* (2013.01); *H01B 1/08* (2013.01); *H01M 10/0562* (2013.01); *C01P 2006/40* (2013.01); *H01M 2300/0068* (2013.01)

(58) Field of Classification Search
CPC .... H01B 1/08; H01M 10/05; H01M 10/0562; G01G 25/02
See application file for complete search history.

(56) References Cited

U.S. PATENT DOCUMENTS

| 4,880,772 A | 11/1989 | Pederson et al. |
| 5,061,682 A | 10/1991 | Aksay et al. |

(Continued)

OTHER PUBLICATIONS

Dong et al "Low temperature synthesis of garnet solid state electrolytes: implications on aluminum incorporation in Li7La3Zr2O12", Solid State Ionics, 350 (2020) 115317.*

(Continued)

*Primary Examiner* — Mark Kopec
(74) *Attorney, Agent, or Firm* — Warner Norcross + Judd LLP

(57) ABSTRACT

A method of preparing a lithium-ion conducting garnet via low-temperature solid-state synthesis is disclosed. The lithium-ion conducting garnet comprises a substantially phase pure aluminum-doped cubic lithium lanthanum zirconate ($Li_7La_3Zr_2O_{14}$). The method includes preparing nanoparticles comprising lanthanum zirconate ($La_2Zr_2O_7$-np) via pyrolysis-mediated reaction of lanthanum nitrate ($La(NO_3)_3$) and zirconium nitrate ($Zr(NO_3)_4$). The method also includes pyrolyzing a solid-state mixture comprising the $La_2Zr_2O_7$-np, lithium nitrate ($LiNO_3$), and aluminum nitrate ($Al(NO_3)_3$) to give the $Li_7La_3Zr_2O_{14}$ and thereby prepare the lithium-ion conducting garnet. A lithium-ion conducting garnet prepared via the method is also disclosed.

19 Claims, 12 Drawing Sheets

(51) Int. Cl.
    *C01G 25/02*     (2006.01)
    *H01M 10/0562*     (2010.01)

(56) References Cited

U.S. PATENT DOCUMENTS

| | | |
|---|---|---|
| 5,114,702 A | 5/1992 | Pederson et al. |
| 5,705,132 A | 1/1998 | Maupin et al. |
| 9,126,189 B2 * | 9/2015 | D'Souza ................. C01G 51/70 |
| 11,084,734 B2 * | 8/2021 | Weller ................. C01G 35/006 |
| 2019/0337817 A1 * | 11/2019 | Weller ................. C09D 133/02 |
| 2021/0198117 A1 * | 7/2021 | Durham ............ H01M 10/0525 |
| 2022/0025502 A1 * | 1/2022 | Durham .............. H01M 4/0402 |

OTHER PUBLICATIONS

Kumar et al "A novel low-temperature solid-state route for nanostructured cubic garnet Li7La3Zr2O12 and its application to Li-ion battery", RSC Adv., 2016, 6, 62656.*

Langer et al "Synthesis of single phase cubic Al-substituted Li7La3Zr2O12 by solid state lithiation of mixed hydroxides", Journal of Alloys and Compounds 645 (2015) 64-69.*

Sacci et al "La2Zr2O7 Nanoparticle-Mediated Synthesis of Porous Al-Doped Li7La3Zr2O12 Garnet", Inorg. Chem. 2021, 60, 10012-10021.*

Afyon et al "A shortcut to garnet-type fast Li-ion conductors for all-solid state batteries", J. Mater. Chem. A, 2015, 3, 18636.*

* cited by examiner

RAPID PYROLYSIS TO FORM SUPER IONIC CONDUCTING LITHIUM GARNETS

CROSS-REFERENCE TO RELATED APPLICATIONS

This application claims the benefit of U.S. Provisional Application 62/965,313, filed Jan. 24, 2020, the content of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The U.S. government has certain rights in the invention.

FIELD OF THE DISCLOSURE

The present disclosure relates generally to lithium-ion conductors having garnet-like crystal structures and, more specifically, to a method of preparing a substantially phase pure aluminum-doped cubic lithium lanthanum zirconate.

BACKGROUND OF THE DISCLOSURE

Solid electrolytes (SEs) can be made mechanically robust (impact resistive), flame resistive, environmentally benign, and compatible with metallic lithium. However, processing of SEs is nontrivial, especially for ceramic based electrolytes, where ion transport through grain boundaries and interfaces tend to have high energy barriers. In contrast, liquid Li-ion electrolytes are toxic, corrosive, flammable; yet, they have unsurpassed ambient conductivity (>1 mS $cm^{-1}$), which enables high power applications. An understated advantage of liquid electrolytes is their processability—they are simply injected into cells at various stages of assembly. Unfortunately, synthesis and processing costs for ceramic electrolytes are high compared with liquid electrolytes, owing in many cases to the high temperatures and long sintering times required to reach product uniformity. As a further problem, these long high-temperature processes promote lithium loss and thus result in difficulty in controlling site defects that affect ionic conductivity.

$Li_7La_3Zr_2O_{14}$ (LLZO) is a lithium-ion conducting garnet that exists in three major phases: tetragonal, cubic, and a high-temperature cubic phase. Without dopants, the tetragonal phase is preferentially formed. Unfortunately, however, this phase possesses orders of magnitude lower Li conductivity (~$10^{-6}$ S $cm^{-1}$) and higher activation energy (~0.47 eV). It has been found that the cubic phase, which allows for lithium migration through interconnected channels in the LLZO structure, can be stabilized by replacing a few molar percent of Li for Al. These channels show low activation energies (~0.3 eV) and high room temperature conductivity (e.g. $10^{-4}$ to $10^{-3}$ S $cm^{-1}$).

In view of the above, the synthesis of LLZO has been increasingly studied, e.g. to compare phase evolution as a function of excess Li precursor loading, dopants, $O_2$ concentration, temperature, etc. As with many ceramic electrolytes, typical routes to synthesize LLZO use high-energy milling to mix (hydr)oxides of La, Zr, and stabilizing dopant with ~20% excess Li hydroxide or carbonate. The resulting powder is typically densified and calcined at high temperatures (e.g. 1000-1200° C.) in flowing $O_2$/dry air for extended durations (e.g. upwards of 12 h). Unfortunately, these synthetic routes do not overcome the disadvantages and limitations outlined above, as the high temperatures and extended reaction/processing times promote lithium loss, resulting in a Li concentration gradient in the materials formed. Moreover, the products of such synthesis tend to form with a mixture of tetragonal and cubic phases, further limiting the general applicability of the methods as well as the utility of the materials formed therewith.

SUMMARY OF THE DISCLOSURE

A method of preparing a lithium-ion conducting garnet is provided. The method utilizes a rapid low-temperature solid-state syntheses to prepare phase pure cubic lithium lanthanum zirconate ($Li_7La_3Zr_2O_{14}$) nanoparticles. Specifically, the method includes preparing nanoparticles comprising lanthanum zirconate ($La_2Zr_2O_7$-np), forming a solid-state mixture comprising the $La_2Zr_2O_7$-np, lithium nitrate ($LiNO_3$), and aluminum nitrate ($Al(NO_3)_3$), and pyrolyzing the solid-state mixture to yield a cubic phase lithium lanthanum zirconate ($Li_7La_3Zr_2O_{14}$), thereby preparing the lithium-ion conducting garnet.

In some embodiments, preparing the $La_2Zr_2O_7$-np comprises reacting lanthanum nitrate ($La(NO_3)_3$), zirconium nitrate ($Zr(NO_3)_4$), and a combustion fuel selected from glycine and carbohydrazide via a combustion reaction.

A lithium-ion conducting garnet prepared via the method is also disclosed. The lithium-ion conducting garnet comprises phase pure cubic $Li_7La_3Zr_2O_{14}$ nanoparticles, which may be utilized to prepare composite electrolytes and related materials for use in galvanic cells, batteries, etc.

These and other features and advantages of the present invention will become apparent from the following description of the invention, when viewed in accordance with the accompanying examples and the appended claims.

BRIEF DESCRIPTION OF THE DRAWINGS

The accompanying drawings, which are incorporated in and form part of the specification, illustrate various examples of the present invention and, together with the detailed description, serve to explain the principles of the invention.

3B showing a plot using a rapid heating step to 700° C. for 2 h and another rapid heating step to 850° C. for ~2 h.

Figure 4:
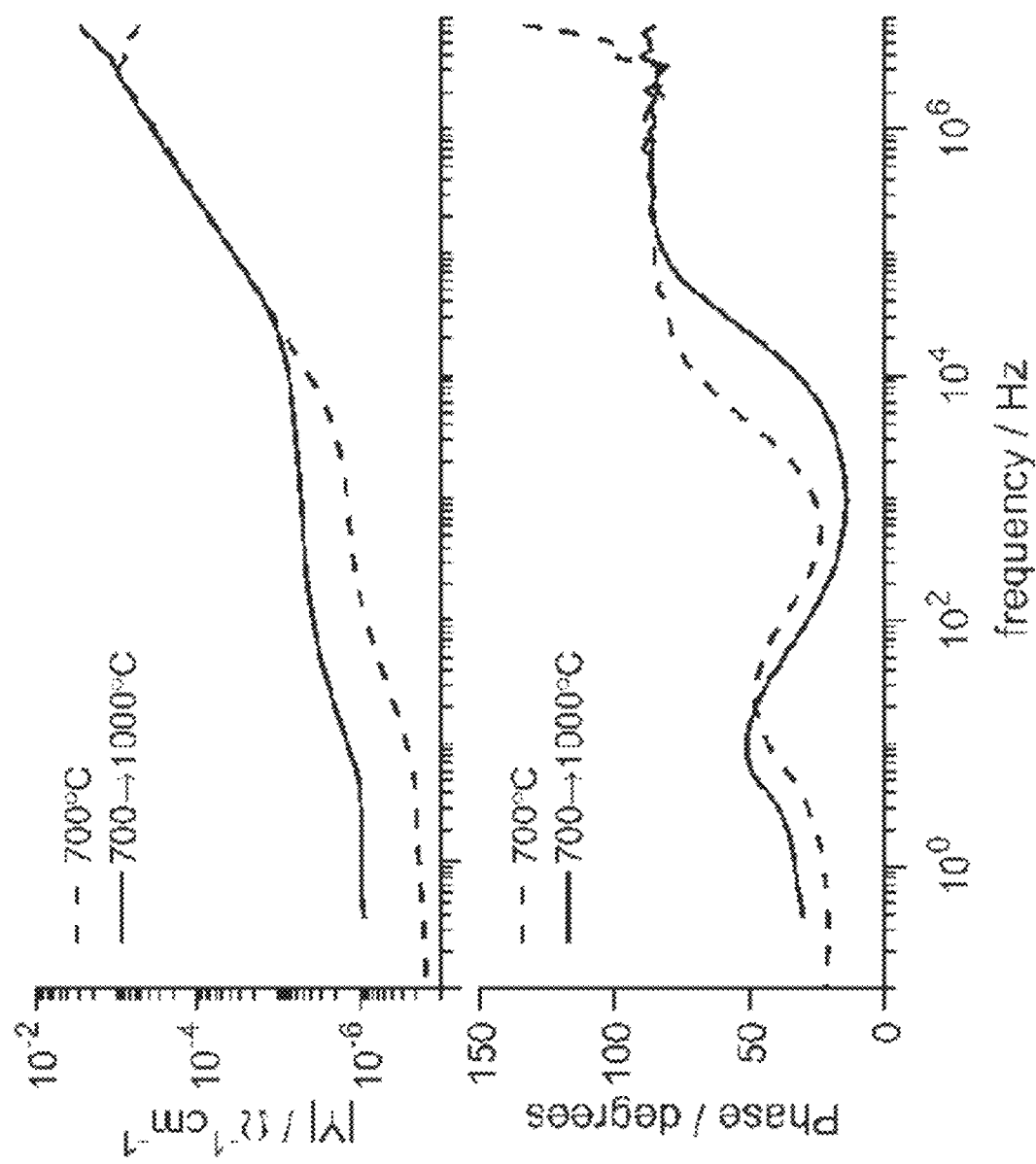

FIG. 4 provides electrochemical impedance spectroscopy (EIS) spectra showing admittance magnitude and phase angles for a $Li_7La_3Zr_2O_{14}$ pellet heat-treated at 700° C. for 12 hours and then 1000° C. for 1 hour.

Figure 5A:
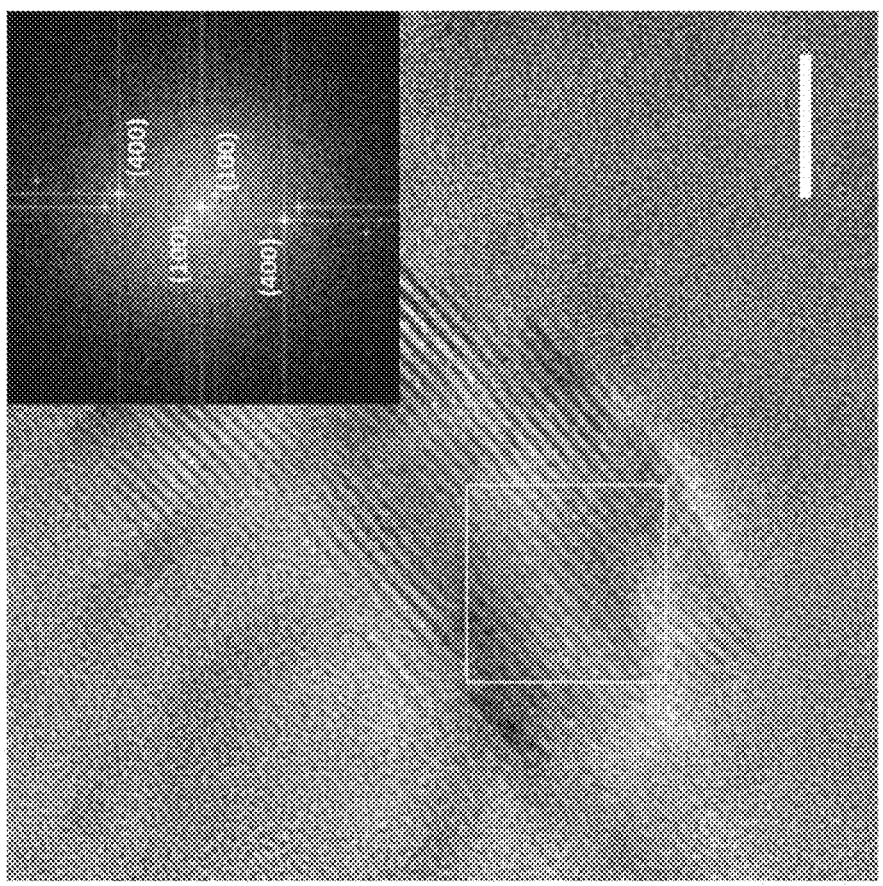
Figure 5B:
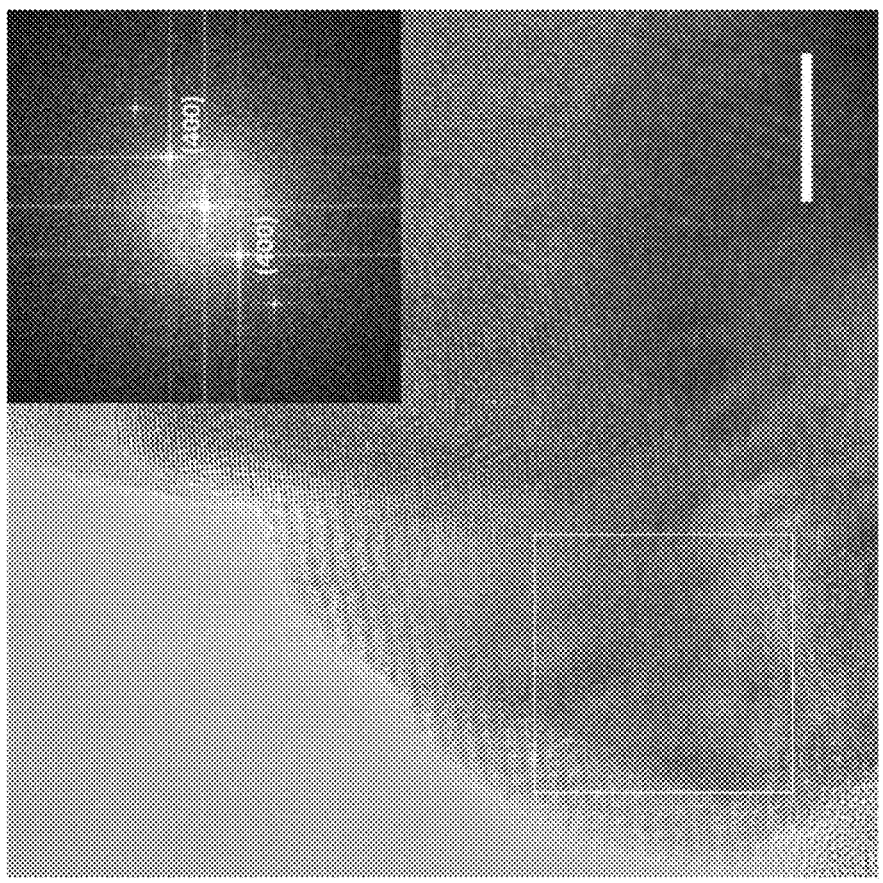
Figure 5C:
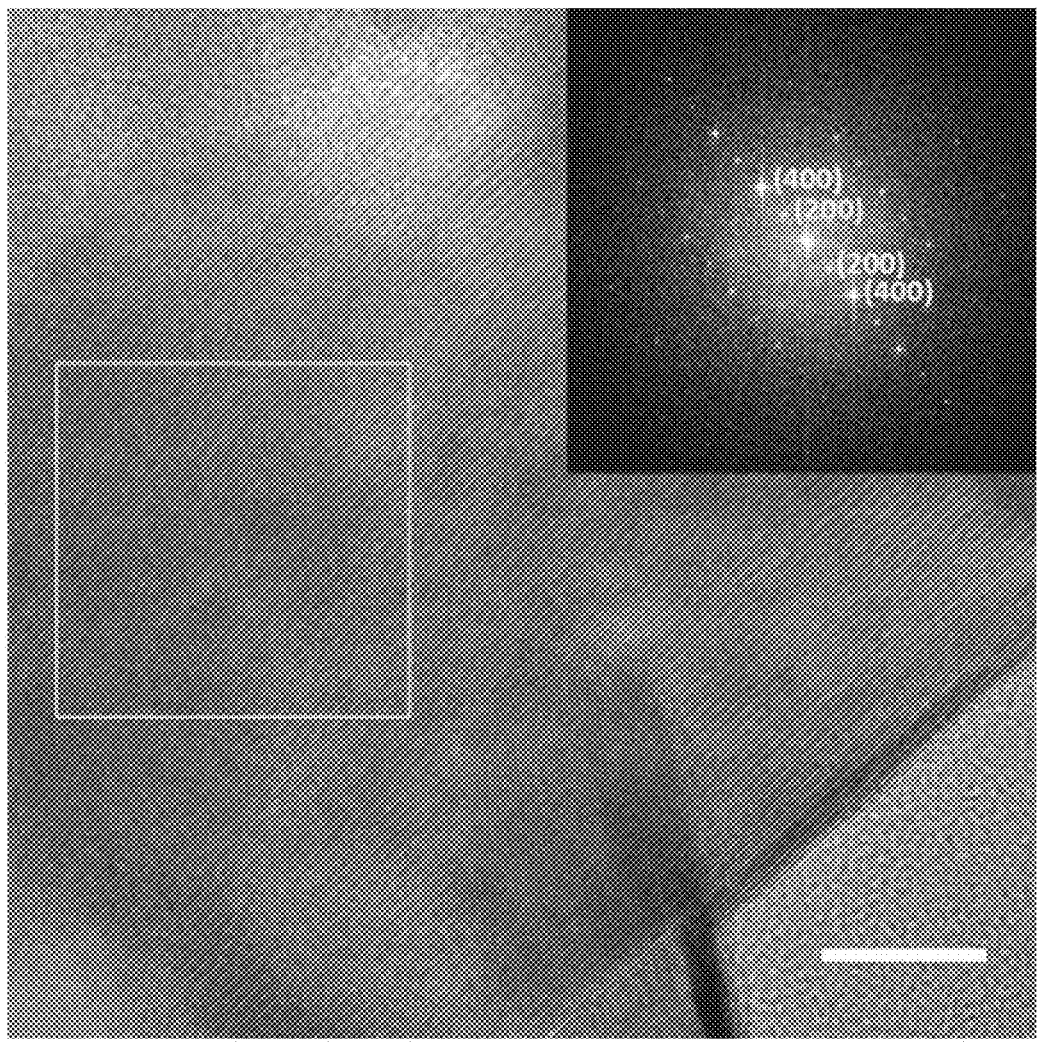

FIGS. 5A-5C provide high-resolution micrographs obtained from transmission electron microscopy (TEM) using compounds prepared in the method, including the carbohydrazide-derived $La_2Zr_2O_7$-np (FIG. 5A), glycine-derived $La_2Zr_2O_7$-np (FIG. 5B), and $Li_7La_3Zr_2O_{14}$ (FIG. 5C), with scale bars representing 10 nm, and inset plots representing fast Fourier transform (FFT) patterns of the indicated/boxed areas.

Figure 6A:
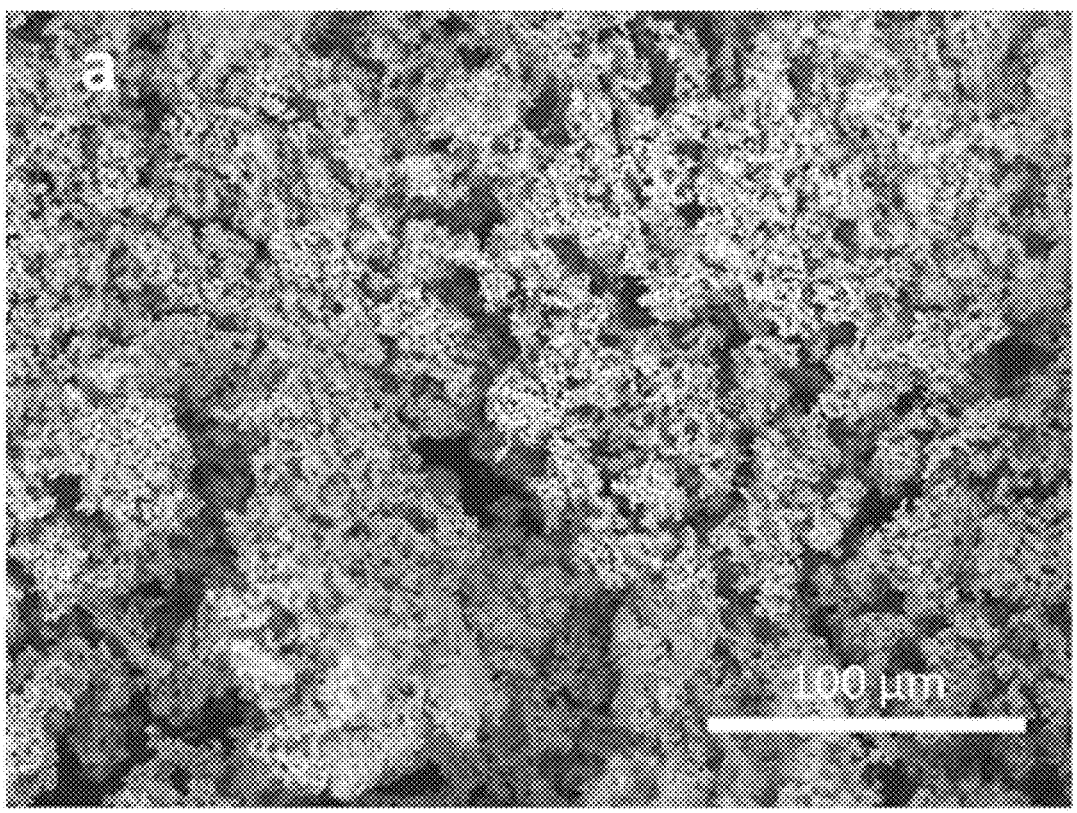
Figure 6B:
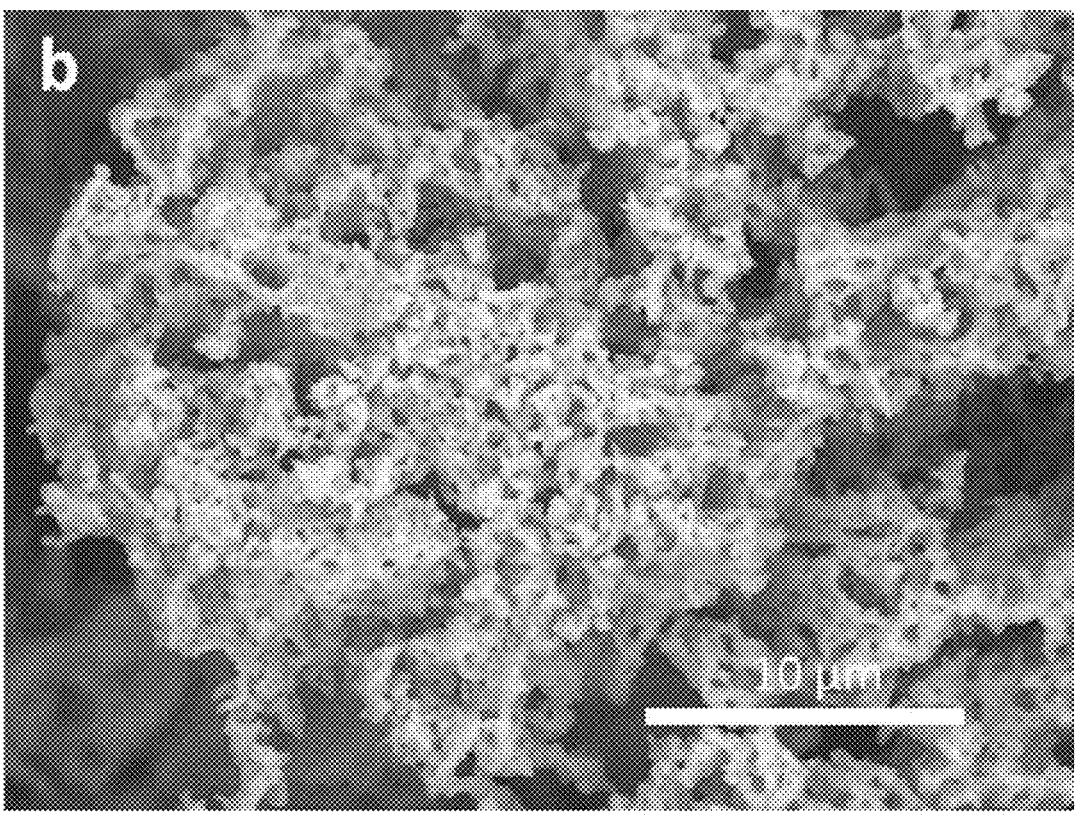
Figure 6C:
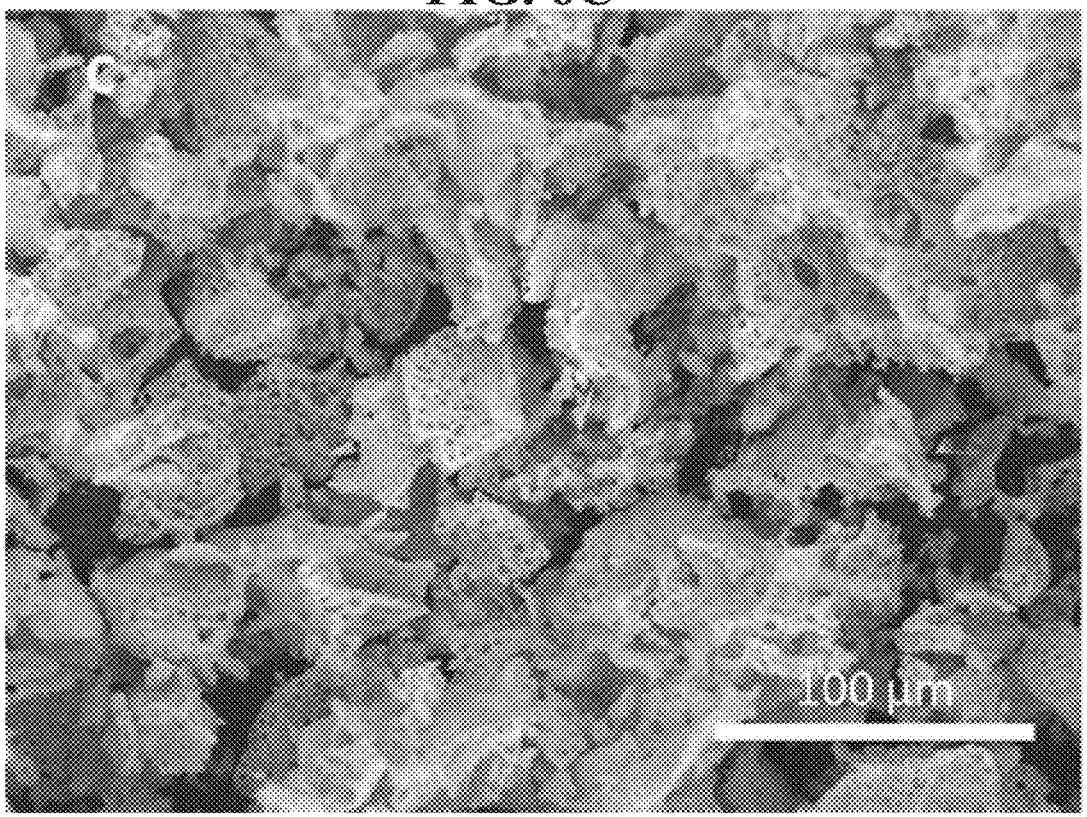
Figure 6D:
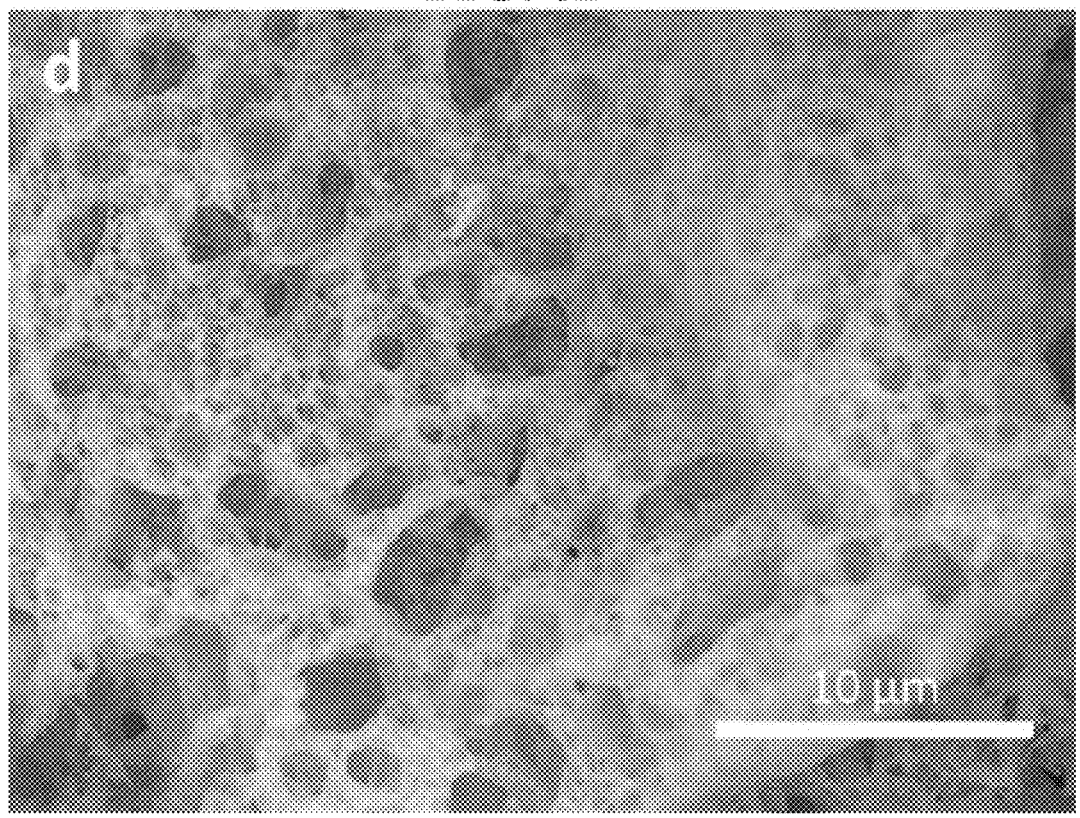
Figure 6E:
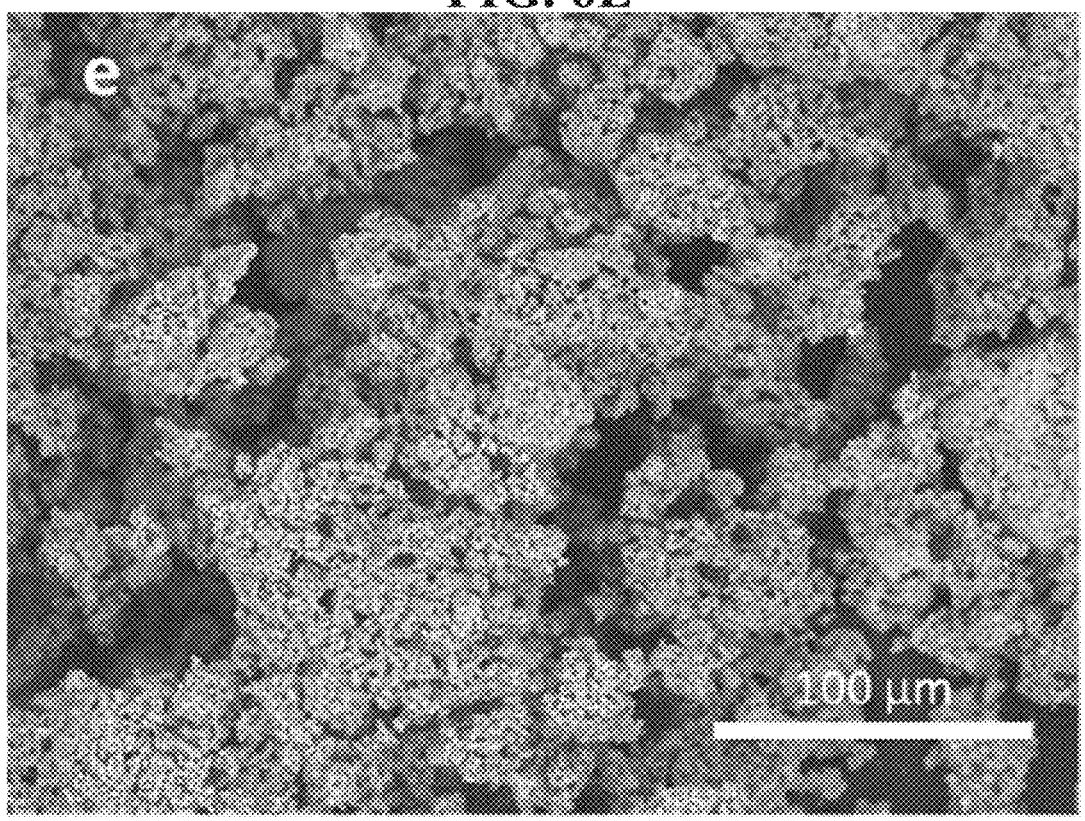
Figure 6F:
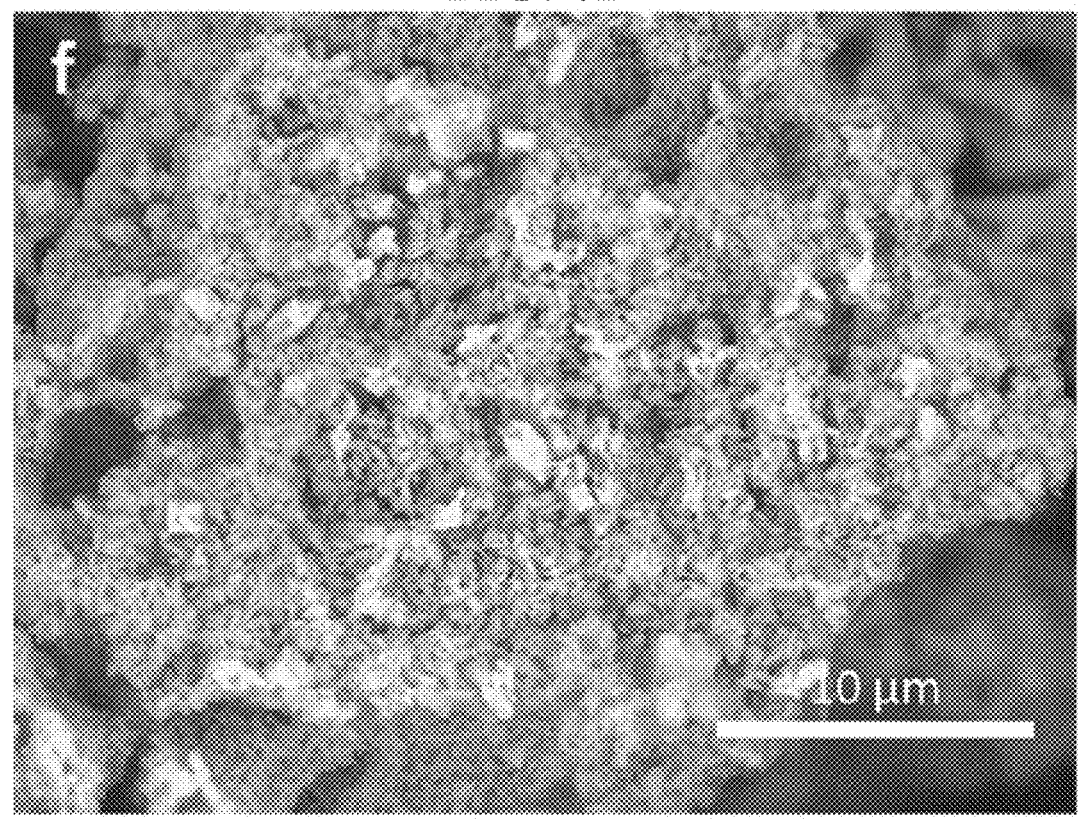

FIGS. 6A-6F provide micrographs obtained from scanning electron microscopy (SEM) using compounds prepared in the method, with carbohydrazide-derived $La_2Zr_2O_7$-np shown at 500× (FIG. 6A) and 5000× (FIG. 6B), glycine-derived $La_2Zr_2O_7$-np shown at 500× (FIG. 6C) and 5000× (FIG. 6D), and $Li_7La_3Zr_2O_{14}$ prepared from carbohydrazide-derived $La_2Zr_2O_7$-np shown at 500× (FIG. 6E) and 5000× (FIG. 6F).

Figure 7:
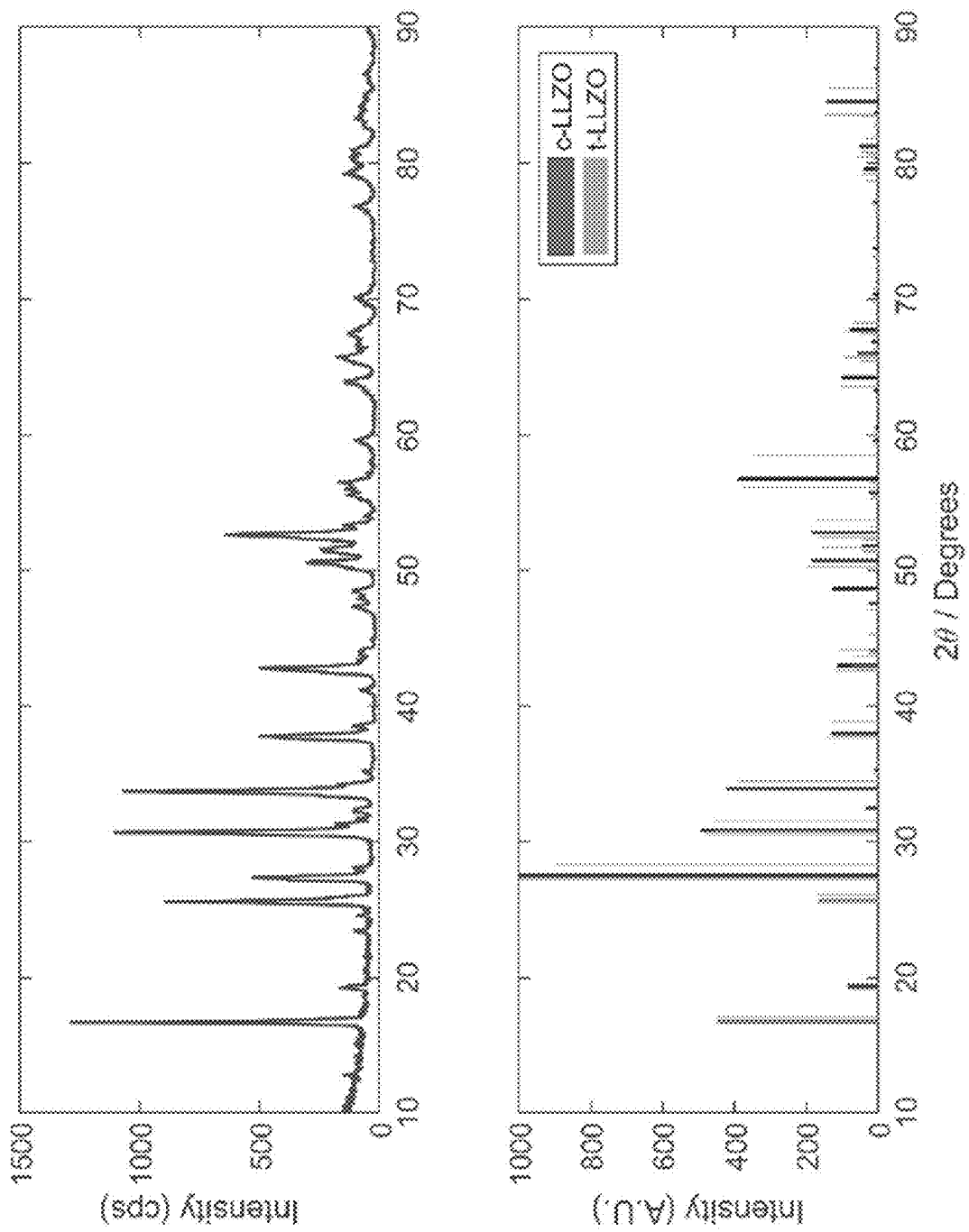

FIG. 7 provides a powder XRD pattern for $Li_7La_3Zr_2O_{14}$ powder quenched from 700° C. (top) plotted against peak positions of cubic LLZO (c-LLZO) and tetragonal LLZO (t-LLZO) (bottom) obtained from the Inorganic Crystal Structure Database (c-LLZO: collection code 185539; t-LLZO: collection code 183685).

DETAILED DESCRIPTION

A method of preparing a lithium-ion conducting garnet is provided. The lithium-ion conducting garnet comprises a substantially phase pure aluminum-doped cubic lithium lanthanum zirconate ($Li_7La_3Zr_2O_{14}$). The method relies on two primary synthetic steps, which include a first reaction to prepare particular nanoparticles comprising lanthanum zirconate ($La_2Zr_2O_7$-np), and a second reaction to transform the $La_2Zr_2O_7$-np into the phase pure cubic $Li_7La_3Zr_2O_{14}$. The particular details and salient parameters of these reactions are described in detail below.

In view of the description and examples provided herein, it will be readily appreciated that the method provides an economical and scalable route to the phase pure cubic garnet via low-temperature solid-state synthesis. As such, the method, and materials prepared therewith, may be used to enable efficient production of solid-state batteries and related devices that may benefit from rapidly-available low-cost solid electrolytes.

With regard method of preparing the lithium-ion conducting garnet, the method comprises preparing lanthanum zirconate (LZO) nanoparticles, i.e., nanoparticles comprising lanthanum zirconate ($La_2Zr_2O_7$-np). In general, preparing the $La_2Zr_2O_7$-np comprises reacting lanthanum nitrate (La($NO_3$)$_3$), zirconium nitrate (Zr($NO_3$)$_4$), and a combustion fuel under pyrolysis conditions. Examples of combustion fuels include urea ($CH_4N_2O$), glycine ($C_2H_5NO_2$), sucrose ($C_{12}H_{22}O_{11}$), glucose ($C_6H_{12}O_6$), citric acid ($C_6H_8O_7$), acetylacetone ($C_5H_8O_2$), hexamethylenetetramine ($C_6H_{12}N_4$), and hydrazine-based fuels such as carbohydrazide ($CH_6N_4O$) and oxalyldihydrazide ($C_2H_6N_4O_2$). In the present embodiments, the combustion fuel is typically an amino-fuel. For example, in certain embodiments, the combustion fuel comprises glycine and/or a hydrazine-based fuel, such as carbohydrazide or oxalyldihydrazide. In specific embodiments, the combustion fuel is selected from glycine and carbohydrazide.

Typically, reacting the La($NO_3$)$_3$, Zr($NO_3$)$_4$, and the combustion fuel to prepare the $La_2Zr_2O_7$-np comprises combining these components together to form a combustible solid-state La/Zr nitrate mixture. In some embodiments, these components are combined together in the presence of a carrier vehicle, such as a solvent, dispersant, diluent, etc. In other embodiments, these components may be provided in a purified and/or processed form (e.g. after drying, heat-treating, pre-mixing, etc.). The La/Zr nitrate mixture may also be processed once any two or more of the components are combined together, e.g. via drying, mixing, grinding (e.g. milling), etc. For example, in some embodiments, the method includes dehydrating the La/Zr nitrate mixture to give the combustible solid-state La/Zr nitrate mixture. In such embodiments, the particular dehydrating process will be selected by one of skill in the art in view of the particular conditions being employed in the method, e.g. with respect to individual component selection, the type of combustion fuel, etc. In certain embodiments, dehydrating the La/Zr nitrate mixture is carried out at a temperature of 180° C. (e.g. via heating). It will be appreciated that other temperatures/conditions may also be employed, but will typically be constrained by the physical properties of the reaction components (e.g. melting temperatures, ignition temperatures, etc.).

Pyrolyzing the solid-state La/Zr nitrate mixture to give the $La_2Zr_2O_7$-np generally comprises heating solid-state La/Zr nitrate mixture to an elevated temperature, e.g. such as a temperature greater than an ignition temperature, melting temperature, and/or the decomposition temperature of one or more components involved. For example, in some embodiments, pyrolyzing the solid-state La/Zr nitrate mixture is carried out at a temperature of 500° C. In these or other embodiments, the solid-state La/Zr nitrate mixture may be ignited at a selected temperature, e.g. without prior heating.

In some embodiments, pyrolyzing the solid-state La/Zr nitrate mixture prepares a reaction product comprising the $La_2Zr_2O_7$-np, and the method further comprises processing the reaction product to give the $La_2Zr_2O_7$-np. Examples of such processing may include purification and/or modification procedures. For example, in certain embodiments, the reaction product may be heat treated (e.g. annealed, sintered, etc.), densified (e.g. compressed, pressed, etc.), etc. One of skill in the art will appreciate that such post-pyrolysis processing steps may be selected based on the particular parameters of the pyrolysis reaction employed, such as the specific combustion fuel utilized.

The particular form of the $La_2Zr_2O_7$-np may vary. In some embodiments, for example, the $La_2Zr_2O_7$-np may have a $La_2Zr_2O_7$ phase crystallite size of from 21 to 47 nm. In these or other embodiments, the $La_2Zr_2O_7$-np may have an average diameter of from 20 to 60 nm.

The method of preparing the lithium-ion conducting garnet also comprises forming a solid-state nanoparticle mixture comprising the $La_2Zr_2O_7$-np, lithium nitrate (LiNO$_3$), and aluminum nitrate (Al(NO$_3$)$_3$) and, subsequently, pyrolyzing the solid-state nanoparticle mixture to give the $Li_7La_3Zr_2O_{14}$.

As with the La/Zr nitrate mixture described above, the components utilized to prepare the solid-state nanoparticle mixture may be combined in any order, in the presence of a carrier vehicle, and/or as neat/dry components. For example, in some embodiments, forming the solid-state nanoparticle mixture comprises combining the $La_2Zr_2O_7$-np with a pre-mix comprising LiNO$_3$, Al(NO$_3$)$_3$. Furthermore, in addition to the $La_2Zr_2O_7$-np, LiNO$_3$, and Al(NO$_3$)$_3$, the solid-state nanoparticle mixture may be formulated with additional components, such as a combustion fuel, a dopant, etc. The combustion fuel and/or dopant may be added to the mixture, e.g. as a stand-alone component or as a part of the pre-mix (if utilized).

The solid-state nanoparticle mixture may also be processed once any two or more of the components are combined together to prepare the solid-state mixture. Examples of such processing include drying, mixing, grinding, etc. The particular processing steps employed, if any, will be selected based on the particular components selected. For example, it will be appreciated that some components, such as $Al(NO_3)_3$, may be utilized as a hydrate. As the solid-state nanoparticle mixture is typically free from any carrier vehicles and/or water during the pyrolysis, a dehydration/drying step may be necessary or optimal to prepare the solid-state nanoparticle mixture in embodiments where a hydrate of one of the metal nitrates is utilized. For example, in certain embodiments, forming the solid-state nanoparticle mixture comprises combining the $La_2Zr_2O_7$-np, $LiNO_3$, and $Al(NO_3)_3$, optionally with any additional components, to give a nanoparticle mixture, and then dehydrating the mixture to give the solid-state nanoparticle mixture. In some such embodiments, the method comprises dehydrating the mixture at a temperature of 180° C. to prepare the solid-state nanoparticle mixture.

The solid-state nanoparticle mixture itself may also be processed, such as via resizing, homogenizing, densifying, etc. For example, in certain embodiments, the method comprises grinding the solid-state nanoparticle mixture before pyrolysis. In these or other embodiments, the method comprises densifying the solid-state nanoparticle mixture before pyrolysis.

In specific embodiments, the method comprises pelletizing the solid-state nanoparticle mixture to form a pellet to be subjected to the pyrolysis conditions. Various conditions and equipment may be utilized for such a pelletizing. In some embodiments, pelletizing comprises pressing the solid-state nanoparticle mixture at an elevated pressure and/or temperature, such as a pressure of at least 100 MPa, a temperature of from 25 to 80° C., etc.

Pyrolyzing the solid-state nanoparticle mixture to give the $Li_7La_3Zr_2O_{14}$ generally comprises heating the solid-state nanoparticle mixture to an elevated temperature, e.g. such as a temperature greater than an ignition temperature, melting temperature, and/or decomposition temperature of one or more components involved. For example, in some embodiments, pyrolyzing the solid-state nanoparticle mixture is carried out at a temperature of 500° C. In these or other embodiments, the solid-state nanoparticle mixture may be ignited at a selected temperature, e.g. without prior heating.

As will be best understood in view of the examples below, the formation of the $Li_7La_3Zr_2O_{14}$ occurs rapidly under the method conditions. More specifically, the reaction of the $La_2Zr_2O_7$-np with $LiNO_3$ rate limited by nitrate decomposition and crystallite growth. As such, the pyrolysis reaction may be carried out for any duration of time, e.g. to achieve increasingly large crystallite sizes, until the size limit of the particular reaction conditions are reached. For example, in some embodiments, the solid-state nanoparticle mixture is pyrolyzed for a duration of from 10 min to 24 hours, such as from 10 min to 20 hours, alternatively from 10 min to 16 hours, alternatively from 10 min to 12 hours. However, in typical embodiments, the reaction time may be relatively short, such as from 10 to 60 min, alternatively from 10 to 45 min, alternative from 10 to 30 min.

Notably, nitrate precursors have been utilized previously to synthesize several ceramics including LLZO, however, the use in the synthesis of battery materials is limited, if possible, due to problems associated with the hygroscopic nature of the compounds (e.g. limited control over stoichiometry, etc.). Against this background, the inventors probed the synthesis pathway of LLZO using neutron diffraction and compared the differences between using $Li_2CO_3$ and $LiNO_3$ precursors, resulting in the finding that the nitrate resulted in amorphous intermediate formation at much lower temperature (~110° C.) over the carbonate counterpart, despite $La_2Zr_2O_7$ (LZO) forming near 500 and 550° C. for carbonate and nitrate precursors, respectively. Without being bound by theory, the inventors believe the lower reaction temperature of the nitrate precursor may be ascribed to the lower melting point (150 vs 730° C.) and thermal decomposition (~500 vs 750° C.)

In some embodiments, pyrolyzing the solid-state nanoparticle mixture prepares a reaction product, such as in intermediate the $Li_7La_3Zr_2O_{14}$ crystallite, and the method further comprises processing the reaction product to give the $Li_7La_3Zr_2O_{14}$ and thereby prepare the lithium-ion conducting garnet. Examples of such processing steps include any of those described herein. For example, in certain embodiments, pyrolyzing the solid-state nanoparticle mixture prepares an intermediate crystallite reaction having a lower conductivity than the $Li_7La_3Zr_2O_{14}$, and the method further comprises processing the intermediate crystallite to yield the $Li_7La_3Zr_2O_{14}$. Particular examples of processing techniques that may be utilized include heat treating, annealing, sintering, densification, etc., as well as combinations thereof. For example, in some embodiments, the method comprises densifying the intermediate crystallite via pressing at an elevated pressure and/or temperature (e.g. 5 MPa, 80° C.) to yield the $Li_7La_3Zr_2O_{14}$. In these or other embodiments, the method comprises heating the intermediate crystallite to a temperature of from 850 to 1000° C. to yield the $Li_7La_3Zr_2O_{14}$.

The particular form of the $Li_7La_3Zr_2O_{14}$ prepared with the method may vary, e.g. depending on the particular reaction parameters and conditions employed, the reagents/components selected, etc. The scope of such variations will be understood by those of skill in the art in view of the examples herein. In general, the method prepares the $Li_7La_3Zr_2O_{14}$ as a phase pure cubic garnet. In certain embodiments, the $Li_7La_3Zr_2O_{14}$ exhibits a crystallite size of at least 150 nm. In these or other embodiments, the $Li_7La_3Zr_2O_{14}$ exhibits a lattice conductivity of at least $4.5 \times 10^{-5}$ S $cm^{-1}$ and/or a bulk conductivity of at least $5 \times 10^{-4}$ S $cm^{-1}$. Methods and techniques for determining such properties are illustrated in the examples below.

The following examples, illustrating embodiments of this disclosure, are intended to illustrate and not to limit the invention. Unless otherwise noted, all reactions are carried out under air, and all solvents, substrates, and reagents are purchased or otherwise obtained from various commercial suppliers and utilized as received.

Analytical Instrumentation and Measurements

Transmission Electron Microscopy (TEM)

TEM experiments, including electron diffraction (ED), were performed using an aberration-corrected FEI Titan S 80-300 scanning transmission electron microscope (STEM), using 300 keV acceleration voltage. The image analysis was carried out using Gatan Digital Micrograph and Image J.

TEM samples were prepared in an Ar filled glovebox by placing a lacey carbon supported copper grid (Electron Microscopy Sciences) inside a vial containing 0.5 g of sample powder (e.g. LZO or LLZO). The vial was gently shaken to let the powder cover the copper grid. The copper grid was then taken out of the vial and gently tapped while being grabbed by tweezers.

Scanning Electron Microscopy (SEM)

SEM experiments were performed using a Hitachi TM3030 Plus tabletop microscope.

SEM samples were prepared as fine powders that covered approximately 1-5 mm$^2$. To prepare for imaging, carbon coated tape was placed on an aluminum sample. A small amount of sample powder was then gently placed on the tape, with excess powder being removed by rotating and tapping the sample holder. The sample holder was then loaded into the microscope for observation. Images were captured using a 15 kV beam in the charge-reduction mode of the instrument.

X-Ray Diffraction (XRD)

XRD experiments were performed using a Scintag PDS 2000 diffractometer equipped with Cu-K$_\alpha$ radiation source, nickel filter, and a quartz zero-background substrate. The detector slit was 0.3 mm. Scattering angles of 10-90° were collected in 0.02° steps with a count time of 2 s per step. Rietveld refinements were performed using the PANalytical HighScore Plus software package by indexing with powder diffraction files (ICDD and COD).

Neutron Diffraction (ND)

ND experiments were performed using the POWGEN (BL-11A) high-resolution neutron powder diffractometer at the Spallation Neutron Source (SNS) at Oak Ridge National Laboratory (ORNL) of Oak Ridge, Tenn., USA.

Sample pellets were placed in a fritted quartz tube lined with alumina paper, and loaded into the ORNL MICAS vacuum furnace equipped with a residual gas analyzer (RGA) to monitor decomposition. The sample holder allowed for an 80/20 mixture of nitrogen and oxygen gas to be flowed past the pellet during heating.

Electrochemical Impedance Spectroscopy (EIS) Measurements

EIS data was collected using a Bio-Logics SP-240 with a current amplitude of 10 µA and a current range of 100 µA in the galvanostatic EIS technique.

EIS measurements performed on pellets obtained in the examples included a sample preparation process that included hand-grinding a pellet in an aluminum oxide mortar and pestle with 5 wt % 1:1 LiOH—LiNO$_3$ (mol:mol).

A measurement assembly was put together by placing a stainless steel electrode in a polyether ether ketone (PEEK) cylinder. The electrode was a close fit to the PEEK cylinder inner diameter (ID: 0.5 inch). A 0.25 inch steel spacer was then placed on top of the electrode, inside the PEEK cylinder. A carbon-coated aluminum contact, a sample (powder), another carbon-coated aluminum contact, a second steel spacer, and the second electrode were placed inside the PEEK cylinder, sequentially. The top and bottom of the PEEK cylinder were capped with stainless steel capping plates. Pressure was applied to the capping plates with a manual hydraulic press. Electrical connection was made by inserting banana plugs into holes in the capping plates. The PEEK cylinder was then wrapped with heater tape connected to a controller, with a Type K control thermocouple wrapped between the tape and the PEEK cylinder.

Thermal measurements were carried out under a 340 MPa unidirectional pellet pressure (provided by the press) after heating a sample powder to 80° C. For each temperature, a 30 minute wait time was allowed before starting EIS measurements. The measurements were monitored until reaching a steady state, generally within 30 minutes. Before the final data was taken, the pressure on the pellet was adjusted via the press to the correct pressure, if needed.

For EIS of as-synthesized pellets, silver SEM paint (Leitsilber 200 silver paint, Ted Pella Inc.) was used to cover both broad faces of a pellet, which was then immediately placed between two stainless steel spacers acting as rigid electrodes. A steel disk was then placed on the electrode-pellet-electrode stack for 30 minutes while the silver paint dried. The stack was then placed in a measurement cell consisting of electrically isolated brass rods, which were used to clamp the stack in place and attached to EIS electrodes for measurement.

Synthesis of La$_2$Zr$_2$O$_7$ Nanoparticles (LZO-np) Using Glycine Or Carbohydrazide Combustion Fuel Example 1

Nanoparticles comprising lanthanum zirconate (La$_2$Zr$_2$O$_7$-np) were synthesized by combustion of lanthanum nitrate (La(NO$_3$)$_3$) and zirconium nitrate (Zr(NO$_3$)$_4$) using glycine. In particular, the metal nitrates were dissolved in a 3:2 La:Zr ratio in water, after which a stoichiometric quantity of glycine was added. The mixture was stirred on a hot plate at 300° C. until auto-ignition was attained. The resulting product was tan in color. Further heat treatment at 900° C. removed residual carbon, producing an airy white powder, which was analyzed according to the procedures above.

Example 2

Nanoparticles comprising lanthanum zirconate (La$_2$Zr$_2$O$_7$-np) were synthesized by combustion of lanthanum nitrate (La(NO$_3$)$_3$) and zirconium nitrate (Zr(NO$_3$)$_4$) using carbohydrazide. In particular, a paste was prepared by mixing the metal nitrates together with a stoichiometric quantity of freshly-prepared carbohydrazide, ensuring uniform mixing and the absence of agglomerates. The paste was added to a flat combustion crucible, which was then placed on a hot plate set at 180° C. After 5 min, the temperate was increased to 450° C. until auto-ignition was attained. The crucible was then allowed to cool on a ceramic block to give the product as an airy white powder, which was analyzed according to the procedures above.

Figure 1A:
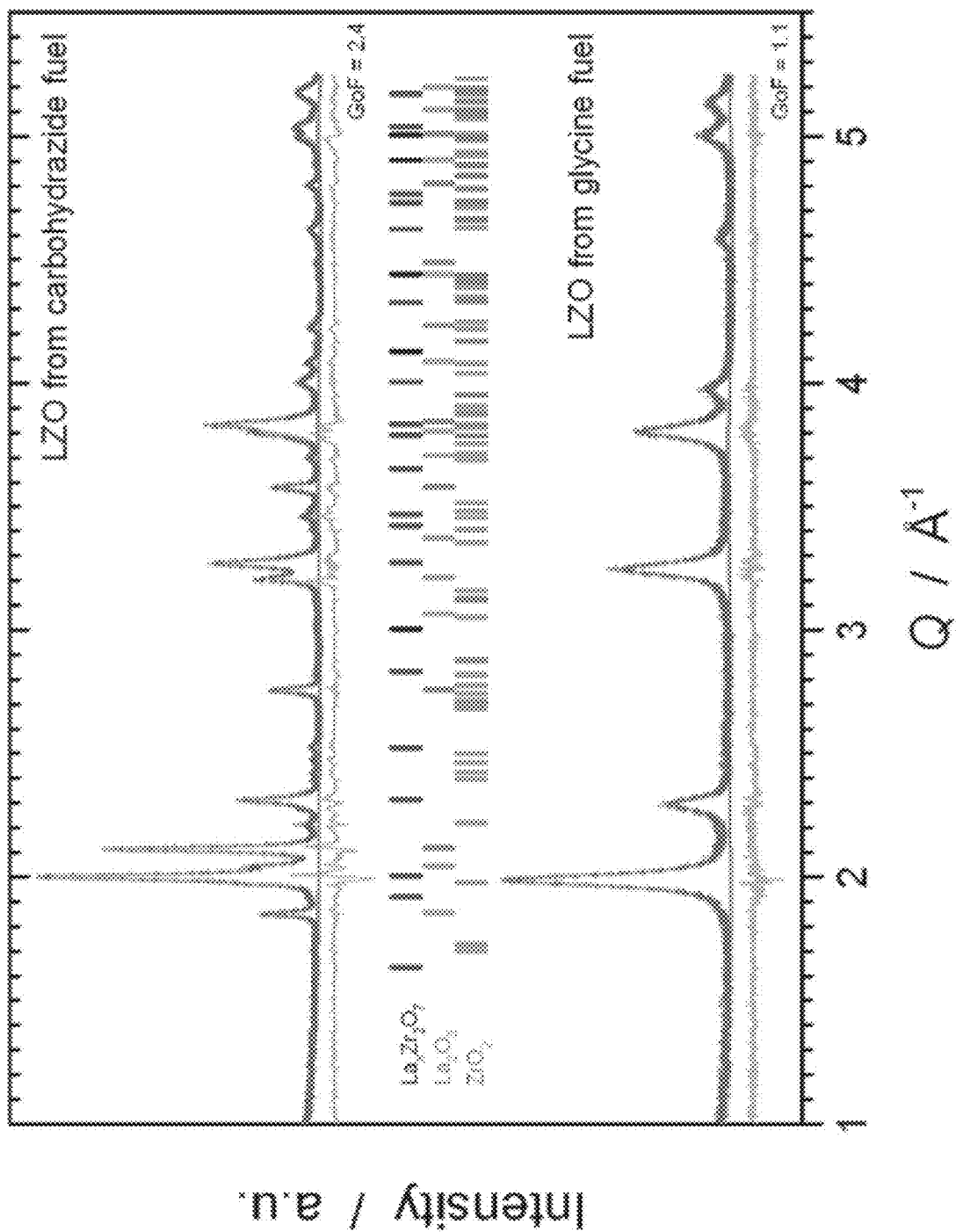
FIG. 1A provides X-Ray diffraction (XRD) patterns of lanthanum zirconate (LZO) nanoparticles ("$La_2Zr_2O_7$-np") prepared and used in the synthesis of lithium lanthanum zirconate ($Li_7La_3Zr_2O_{14}$; LLZO), with carbohydrazide-derived $La_2Zr_2O_7$-np (top), glycine-derived $La_2Zr_2O_7$-np (bottom), and Rietveld refinement and residuals co-plotted.

With regard to Examples 1 and 2, the entire process, from mixing of reagents to collection of the La$_2$Zr$_2$O$_7$-np reaction product (i.e., La$_2$Zr$_2$O$_7$-np) was conducted in 20 min. Both La$_2$Zr$_2$O$_7$-np products were analyzed via XRD, the patterns of which are shown in FIG. 1A along with Rietveld refinement and residuals. As shown, the XRD pattern of the glycine-derived La$_2$Zr$_2$O$_7$-np includes broad Bragg peaks of single phase La$_2$Zr$_2$O$_7$ (a=10.959 Å, F d-3 m), and the XRD pattern of the carbohydrazide-derived La$_2$Zr$_2$O$_7$-np includes broad peaks associated with La$_2$Zr$_2$O$_7$+La$_2$O$_3$, which is believed to crystallize due to the carbohydrazide fuel burning more intensely. The lattice constant for La$_2$Zr$_2$O$_7$ was determined to be 10.901 Å.

It will be appreciated that La$_3$Zr$_2$O$_x$ is not a known phase, nor a line compound, and the XRD experiments did not suggest a new phase. Rather, refinement of the diffraction patterns shows near equal site occupation, such that excess La is believed to reside elsewhere (e.g. for the glycine product, the excess La resides in the amorphous region). Unless otherwise noted, reference to the La$_2$Zr$_2$O$_7$-np is to be understood to refer to the La$_3$Zr$_2$O$_x$ product from combustion, including any mixture of phases therein.

Using the Scherrer equation to estimate average crystallite size from the full-width-half-max (FWHM) of the Bragg peaks, a crystallite size of 21 nm was determined from the pattern of the glycine-derived $La_2Zr_2O_7$-np, while a 47 nm crystallite size ($La_2Zr_2O_7$ phase) was determined from the pattern of the carbohydrazide-derived $La_2Zr_2O_7$-np.

Both $La_2Zr_2O_7$-np products were analyzed via TEM, the micrographs of which are shown in FIGS. 5A-5C. As shown, the glycine-derived $La_2Zr_2O_7$-np exhibits a significant amorphous nature including small, sub-30 nm particles. The carbohydrazide-derived $La_2Zr_2O_7$-np showed representative particle sizes between 20 and 60 nm, with less amorphous regions than the glycine-derived $La_2Zr_2O_7$-np. Electron diffraction of the particles confirmed that the crystallites of both samples were in fact $La_2Zr_2O_7$ (insets, FIG. 5A. Crystalline $La_2Zr_2O_7$ was also shown via SEM, as indicated by the electron diffraction spots in the SEM micrographs shown in FIGS. 6A-6D.

Solid-State Synthesis of $Li_7La_3Zr_2O_{14}$ (LLZO) From $La_2Zr_2O_7$-np

Example 3

$La_2Zr_2O_7$-np, lithium nitrate ($LiNO_3$), and aluminum nitrate ($Al(NO_3)_3$) were hand ground for 1 min and then pressed into a 3 mm thick pellet at 100 MPa for 2 min. The pellet was reacted at 1000° C. in a quartz tube furnace under flowing oxygen for 10 hours to give a lithium lanthanum zirconate ($Li_7La_3Zr_2O_{14}$), which was analyzed according to the procedures above.

Figure 1B:
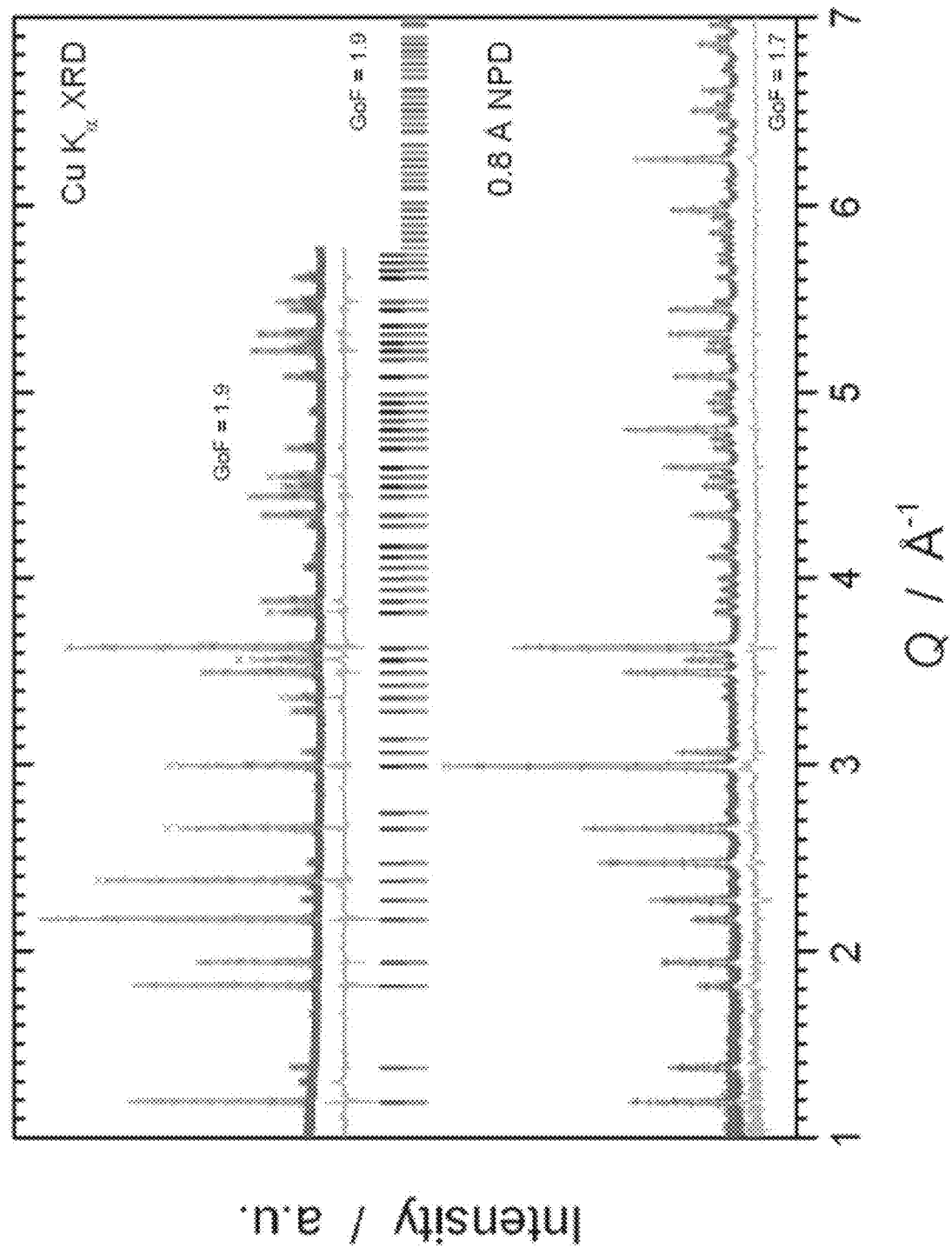
FIG. 1B provides XRD and neutron diffraction (ND) patterns for $Li_7La_3Zr_2O_{14}$ prepared from carbohydrazide-derived $La_2Zr_2O_7$-np, fitted to cubic LLZO.

As shown in FIG. 1B, the XRD and NPD patterns indicate the reaction product of Example 3 is phase pure cubic $Li_7La_3Zr_2O_{14}$ (a=12.974 Å, I a-3d). Additionally, as shown in the electron micrographs set forth in FIG. 5C and FIGS. 6E-6F, the crystallite size of the $Li_7La_3Zr_2O_{14}$ is larger than those of the $La_2Zr_2O_7$-np precursors. This outcome is further supported by the XRD peaks (e.g. shown in FIG. 1B) being significantly sharper than those of the precursor $La_2Zr_2O_7$-np, which are shown in FIG. 1A. The Scherrer equation provides a calculated crystallite size of between 120 and 150 nm of the product $Li_7La_3Zr_2O_{14}$.

Notably, the reaction of Example 3 proceeded at ~200° C. lower than standard protocols known in the art. Moreover, while typical solid-state syntheses require extensive grinding (e.g. to promote mixing and intimate particle-particle contact), the present method is not so constrained, but instead proceeds efficiently and effectively without such physical processing of the starting materials. It is believed that the method overcomes the limitations of conventional solid-state synthesis procedures by exploiting the relatively-low melting and decomposition temperatures of the Li/Al nitrates (e.g. as compared to their carbonate counterparts), as well as the relatively-high specific surface area of the $La_2Zr_2O_7$-np prepared and used in the method. From the examples and observations described herein, it is believed that the $La_2Zr_2O_7$-np and Li/Al nitrates may react under constant contact and uniform mixing at temperatures above 200° C.

Example 4 & Comparative Example 1

A pellet comprising $LiNO_3$, $Al(NO_3)_3$, and $La_2Zr_2O_7$-np (Example 4) was prepared as described above. For a comparative example, a pellet composed of mechanically mixed nitrate precursors, i.e., Li/Al/La/Zr nitrates (Comparative Ex. 1, the "$NO_3$-mixture"), was also prepared. Both pellets were subjected to the same heating protocol and analyzed via thermal gravimetric analysis (TGA) and differential scanning calorimetry (DSC).

Figure 2A:
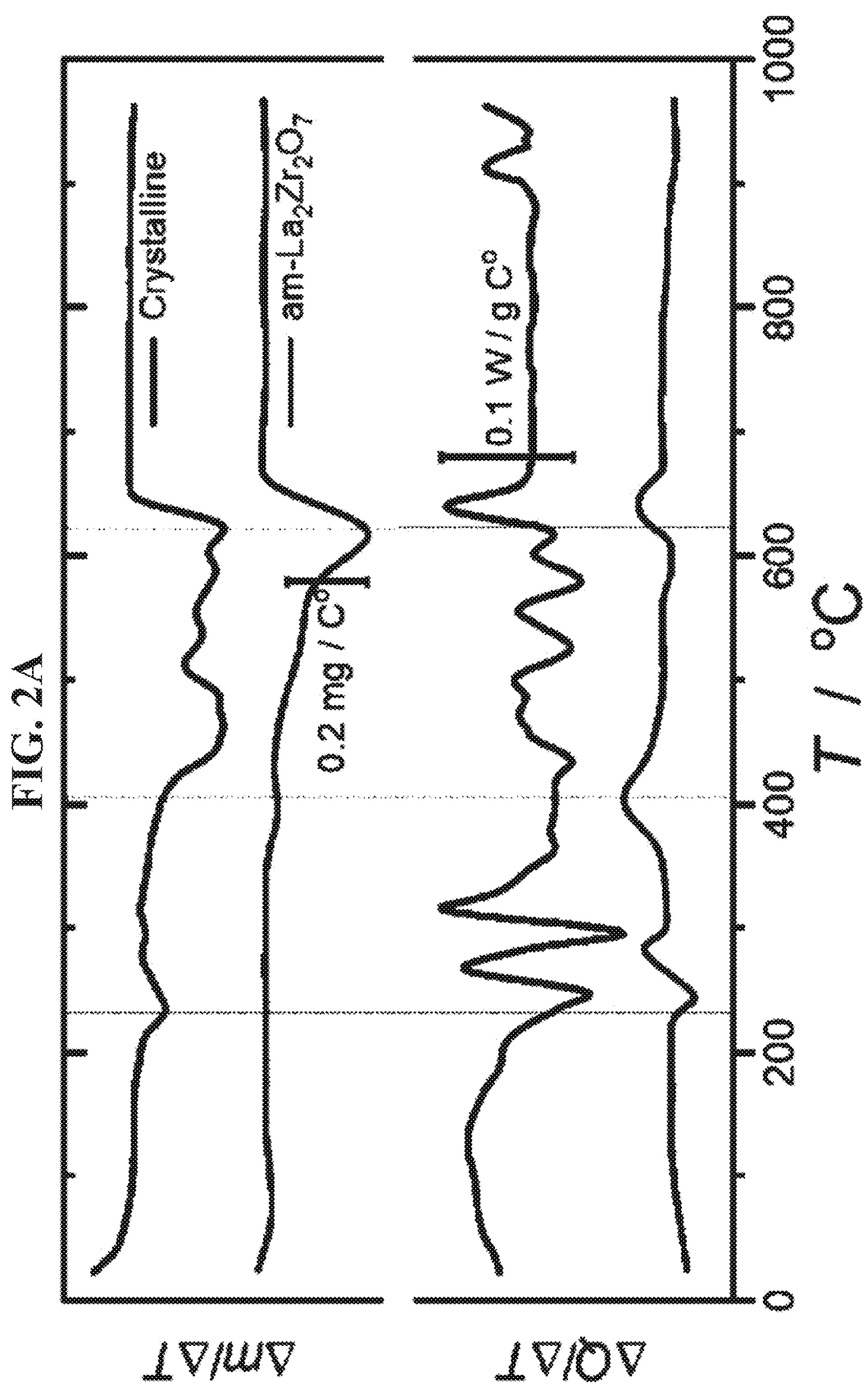
FIG. 2A provides differential thermal gravimetric analysis (TGA) and scanning calorimetry (DSC) curves for a comparative metal nitrate composition (top lines) and a mixture of the carbohydrazide-derived $La_2Zr_2O_7$-np with Li/Al nitrates (bottom lines).

Differential TGA and DSC curves for Example 4 and Comparative Ex. 1 are set forth in FIG. 2A.

With regard to Comparative Ex. 1, a clear melting signature (negative peak) in the DSC derivative curve ($\Delta Q/\Delta T$) of the $NO_3$-mixture is present at ~180° C., and a mass loss in the TGA curve ($\Delta m/\Delta T$) is present at 210° C. due to mixed nitrate dehydration. After the melting and dehydration steps, the $NO_3$-mixture shows multiple peaks in both TGA and DSC curves between 400 and 650° C., which result from decomposition of nitrates that are bound to different ions and react according to binding strength and chemical environment. This result suggests a complicated reaction pathway, which is confirmed by ex situ XRD shows many different intermediates from the $NO_3$-mixture.

On the other hand, the $La_2Zr_2O_7$-np mixture of Example 4 shows only two peaks in the DSC curve after the initial nitrate melt, at 405 and 640° C., which the TGA curve indicates correspond to the initiation and completion of nitrate decomposition, respectively. Most of the mass loss occurs above 600° C., which agrees with studies of $LiNO_3$ decomposition. Therefore, the $La_2Zr_2O_7$-np mixture shows a more direct reaction pathway, whereby $LiNO_3$ melts, decomposes, and turns into $Li_2O$ that becomes absorbed by the $La_2Zr_2O_7$-np to give the $Li_7La_3Zr_2O_{14}$.

Example 5: Gas Production Assessment

A pellet comprising $LiNO_3$, $Al(NO_3)_3$, and $La_2Zr_2O_7$-np was prepared as described above, and analyzed for gas production during an in situ neutron diffraction measurement using the residual gas analyzer (RGA) and other equipment described above. The RGA curve plot resulting from the experiment is shown in in FIG. 2B, and indicates that trace $CO_2$ and $H_2O$ are removed from the sample by 300° C., and that each temperature step after 400° C. showed loss of NO, NO2, and O2 from the pellet. These lost gasses are the expected products of nitrate decompositions. The observed nitrate decomposition time constant (inverse of rate constant) as calculated by NO production rate was found to be ~5 min (kobs=$3.2 \times 10^{-3}$ s$^{-1}$). This number was obtained by fitting the transient RGA signal to the following expression (Equation 1):

$$\frac{dI_{NO}}{dt} = I_{NO}^0 e^{-t/\tau} \quad \text{(Eq. 1)}$$

Figure 2B:
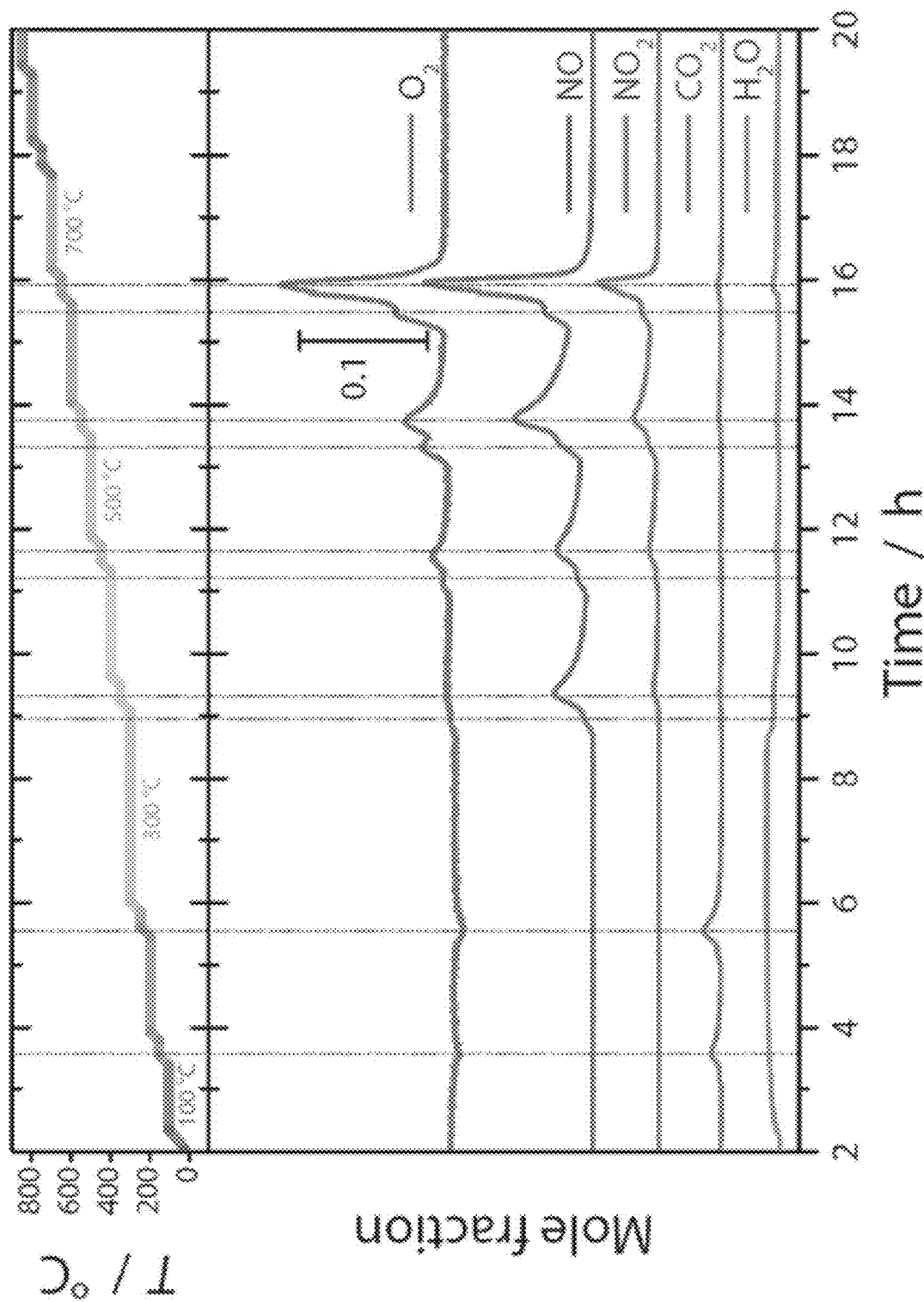
FIG. 2B provides a temperature protocol and in situ residual gas analyzer (RGA) curves (offset for clarity) for a neutron scattering experiment involving $Li_7La_3Zr_2O_{14}$ synthesis from carbohydrazide-derived $La_2Zr_2O_7$-np.

Example 6: Comparison of Glycine- and Carbohydrazide-Derived $La_2Zr_2O_7$ Nanoparticles Differences in the reaction mechanism between precursors was evaluated for the glycine-derived $La_2Zr_2O_7$-np and the carbohydrazide-derived $La_2Zr_2O_7$-np via neutron diffraction (ND) evaluation introduced above. Specifically, a sample of carbohydrazide-derived $La_2Zr_2O_7$-np was heated with a ramp rate of 5° C. min$^{-1}$ and ~1 h soak temperatures every 50° C. to 850° C., as shown in FIG. 2B. The glycine-derived $La_2Zr_2O_7$-np was heated with the same ramp rate and soaking times; however, the soak temperatures were 250, 500, 700, and 850° C. Diffraction data were collected at a 1.5 Å wavelength center that covers a d-spacing of 0.7 to 8 Å (or Q of 0.8 and 9 Å$^{-1}$).

The results of the in situ ND experiment shows that the sample is a mixture of LZO and $LiNO_3$; the $Al(NO_3)_3 \cdot 9H_2O$ signals were below detection limit. No reflections are observed from $La_2O_3$ and $ZrO_2$. $La_2Zr_2O_7$ signals at 3.15 and 1.93 Å are present from the onset, and sharpen almost instantly upon heating (i.e., as the crystallites increase). At ~200° C. the $LiNO_3$ reflections begin to decrease due to melting. The system is mostly amorphous between 200 and 650° C. and, after 650° C., many peaks form. The $La_2Zr_2O_7$ bands sharpen and decrease in intensity, and the major reflections at 5.3, 4.1, and 3.4 Å d-spacings, which correspond to cubic $Li_7La_3Zr_2O_{14}$, $LiAlO_2$, and $SiO_2$, respectively, quickly grow. The latter is believed to be from the propensity of quartz to crystalize from interaction with volatile Li, and it is suspected that the $LiAlO_2$ arises from reaction of lithium with the alumina paper. In the in situ ND data, the $La_2Zr_2O_7$ peaks were not fully removed, nor the $LiAlO_2$. In all ex situ reactions these peaks are gone after at least 30 min of calcining at 750° C., which further suggest irreversible Li loss to the $AlO_2$ paper.

Example 7: Reaction Kinetics Assessment

Figure 3A:
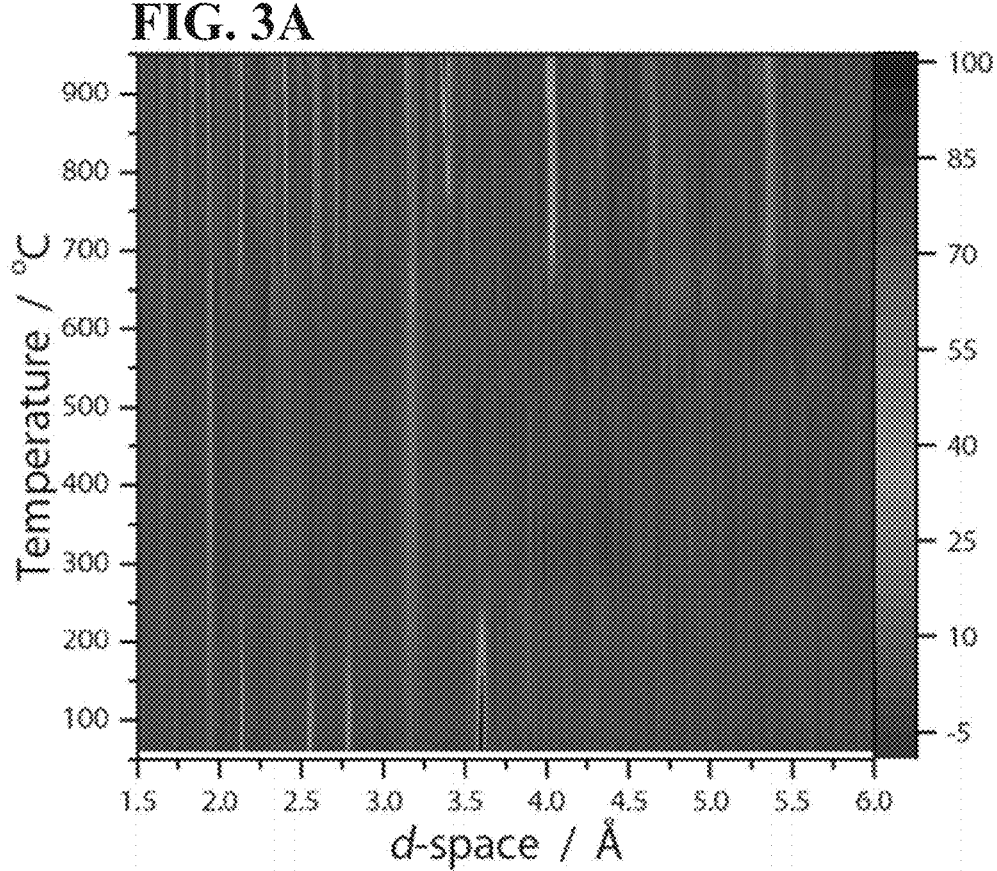
FIGS. 3A-3B provide ND contour plots of a reaction of the glycine-derived $La_2Zr_2O_7$-np to form $Li_7La_3Zr_2O_{14}$, with FIG. 3A showing a plot for a heating experiment using the same temperature protocol shown in FIG. 2B, and FIG.
Figure 3B:
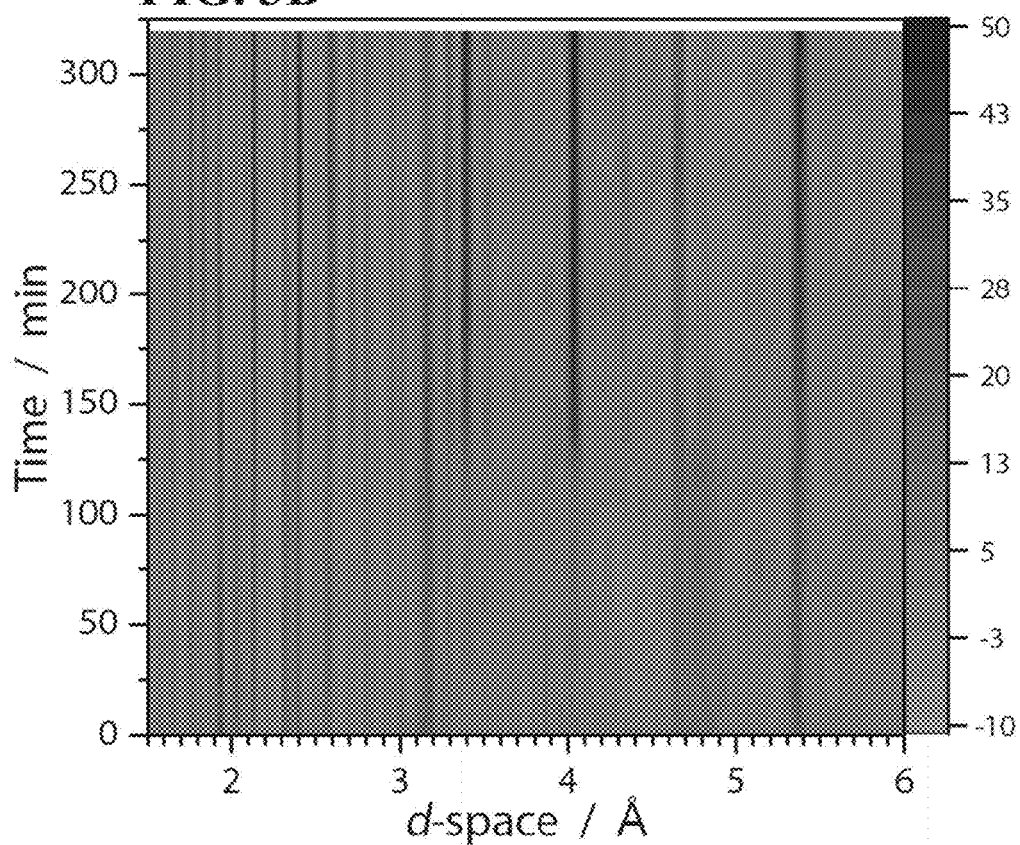

An attempt to gain insight into the kinetics of the $La_2Zr_2O_7$-np reaction by rapidly increasing the sample temperature to 700° C. while collecting ND data as set forth above. The signal to noise ratio allowed for 10 min resolution in the diffraction data. However, this was not fast enough to capture a reaction rate. FIG. 3B shows that from time=0 to time=10 min the $Li_7La_3Zr_2O_{14}$ is formed and equilibrated to the temperature. Increasing the temperature to 850° C. shows only a slight difference in signal intensity (amount). However, crystallization of $SiO_2$ rapidly occurs here. The time constant of NO production was found to be 5 min. This is smaller than the ND time resolution utilized; however, given that the nitrate decomposition time constant was determined to be ~5 min (FIG. 2B), it is believed that nitrate decomposition may be the rate determining step. If so, then as soon as Li or Al oxide are made, they are taken up by the $La_2Zr_2O_7$ to form $Li_7La_3Zr_2O_{14}$. This is further supported by the simplicity of the $La_2Zr_2O_7$-mixture DSG curve in FIG. 2A. Based on the above, it is believed that the entire reaction to form cubic $Li_7La_3Zr_2O_{14}$ could be done in less than 30 min.

Example 8: Preparation and Growth of $Li_7La_3Zr_2O_{14}$ Crystallites

A pellet of hand ground carbohydrazide-derived $La_2Zr_2O_7$-np+Li/Al nitrates was prepared as described above, and calcined at 1000° C. for 10 min in a quartz tube furnace. FIGS. 6E-6F shows the product to be cubic $Li_7La_3Zr_2O_{14}$ with no trace of $La_2Zr_2O_7$ precursor. Further annealing for 20 min increments for 60 min showed that the FWHMs of the reflections decrease with time. The crystallites grew at a rate of 5 Å $min^{-1}$, assuming linear range for crystallite growth was achieved. The result after 12 h calcination was ~150 nm crystallite sizes.

Example 9: Electrochemical Impedance Spectroscopy (EIS) Measurements

A $La_2Zr_2O_7$-np pellet was prepared as described above, and then heat-treated at 700° C. for 12 hours. The product of this heat-treating matched the cubic phase.

Ag contacts were painted on the pellet (without densifying it), and the electrical impedance then measured. The results of the impedance measurements are set forth in FIG. 4. Afterward the impedance measurement, the pellet was heated from 23 to 1000° C. in ~15 min, calcined at 1000° C. for 1 hour, then rapidly cooled. XRD measurements for both 700° C. and 1000° C. heat treatments showed cubic phases, as shown in FIG. 7. Conductivity measurements of the pellets (without repressing) showed significant change: the 700° C. pellet showed a lattice conductivity of ~$10^{-6}$ S $cm^{-1}$ ($\epsilon'$=52), and after heating to 1000° C., the conductivity increased to $4.5 \times 10^{-5}$ S $cm^{-1}$. The pellet was not pressed, and exhibited a pellet porosity of 32%. This is believed to be the major cause of the low conductivity. Grain boundary/particle-particle contact conductivity was significantly lower for both the 700 and 1000° C. pellets, at $10^{-7}$ S $cm^{-1}$. That said, increasing crystallite size does have a major effect on the conductivity. Further, densification of the 1000° C. pellet above, to 60% dense (e.g. via 5 MPa at 80° C.), resulted in bulk conductivity measurement of $5 \times 10^{-4}$ S $cm^{-1}$ ($\epsilon'$=70), which is in line with expectations.

In view of the examples above, it will be appreciated that the method provides a means for decreasing the overall reaction temperature to form $Li_7La_3Zr_2O_{14}$, which is beneficial in driving down the energy/time of the synthesis step. Moreover, using $La_2Zr_2O_7$-np clearly decreases the reaction temperature and time, and allows for lower conductivity cubic $Li_7La_3Zr_2O_{14}$ to be isolated and processed to increase conductivity. It is to be appreciated that conductivity-increasing processing is not limited, and may be shorted and/or simplified over the exemplary techniques used above. For example, the processing step may be shortened, and flash hot pressing or plasma spark sintering may be used to quickly form dense electrolyte membranes from the $Li_7La_3Zr_2O_{14}$. This study also suggests that using thin films of LLZO can be made by reacting lithium/aluminum nitrate on amorphous LZO thin films.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A method of preparing a lithium-ion conducting garnet, said method comprising:
preparing nanoparticles comprising lanthanum zirconate having the chemical formula $La_2Zr_2O_7$-np;
forming a solid-state mixture comprising the $La_2Zr_2O_7$-np, lithium nitrate having the chemical formula $LiNO_3$, and aluminum nitrate having the chemical formula $Al(NO_3)_3$; and
pyrolyzing the solid-state mixture to yield an aluminum-doped cubic phase lithium lanthanum zirconate having the chemical formula $Li_7La_3Zr_2O_{14}$, thereby preparing the lithium-ion conducting garnet.

2. The method of claim 1, wherein preparing the $La_2Zr_2O_7$-np comprises reacting lanthanum nitrate having the chemical formula $La(NO_3)_3$, zirconium nitrate having the chemical formula $Zr(NO_3)_4$, and a combustion fuel selected from glycine and carbohydrazide via combustion reaction.

3. The method of claim 2, wherein reacting $La(NO_3)_3$, $Zr(NO_3)_4$, and the combustion fuel comprises:
combining $La(NO_3)_3$, $Zr(NO_3)_4$, and the combustion fuel to give a La/Zr nitrate mixture;
dehydrating the La/Zr nitrate mixture to give a combustible solid-state La/Zr nitrate mixture; and
pyrolyzing the solid-state La/Zr nitrate mixture to give the $La_2Zr_2O_7$-np.

4. The method of claim 3, wherein: (i) dehydrating the La/Zr nitrate is carried out at a temperature of 180° C.; (ii) pyrolyzing the solid-state La/Zr nitrate mixture comprises heating the solid-state La/Zr nitrate mixture to an ignition temperature greater than the auto-ignition temperature of the combustion fuel; (iii) pyrolyzing the solid-state La/Zr nitrate mixture is carried out at a temperature of 500° C.; or (iv) any combination of (i)-(iii).

5. The method of claim 3, wherein pyrolyzing the solid-state La/Zr nitrate mixture prepares a reaction product comprising the $La_2Zr_2O_7$-np, and wherein the method further comprises processing the reaction product via: (i) heat treatment; (ii) densification; or (iii) both (i) and (ii), to give the $La_2Zr_2O_7$-np.

6. The method of claim 2, wherein the combustion fuel is carbohydrazide.

7. The method of claim 2, wherein the combustion fuel is glycine.

8. The method of claim 1, wherein the $La_2Zr_2O_7$-np: (i) have an average diameter of from 20 to 60 nm; (ii) have a $La_2Zr_2O_7$ phase crystallite size of from 21 to 47 nm; or (iii) both (i) and (ii).

9. The method of claim 1, wherein forming the solid-state mixture comprises combining the $La_2Zr_2O_7$-np, $LiNO_3$, $Al(NO_3)_3$ to give a mixture, and dehydrating the mixture to give the solid-state mixture.

10. The method of claim 9, wherein: (i) forming the solid-state mixture comprises combining the $La_2Zr_2O_7$-np with a pre-mix comprising $LiNO_3$, $Al(NO_3)_3$ to give the mixture; (ii) the mixture further comprises a combustion fuel; (iii) the mixture further comprises a dopant; (iv) dehydrating the mixture is carried out at a temperature of 180° C.; or (v) any combination of (i)-(iv).

11. The method of claim 1, further comprising: (i) grinding the solid-state mixture before pyrolysis; (ii) densifying the solid-state mixture before pyrolysis; or (iii) both (i) and (ii).

12. The method of claim 11, wherein the method comprises densifying the solid-state mixture before pyrolysis, wherein densifying the solid-state mixture comprises pelletizing the solid-state mixture to form a pellet, and wherein pyrolyzing the solid-state mixture is further defined as pyrolyzing the pellet.

13. The method of claim 12, wherein pelletizing the solid-state mixture comprises pressing the solid-state mixture at a pressure of 100 MPa for at least 2 minutes.

14. The method of claim 1, wherein: (i) the solid-state mixture is pyrolyzed at a temperature of 500° C.; (ii) the solid-state mixture is pyrolyzed for a duration of from 10 min to 1 hour; (iii) the solid-state mixture is free from a carrier vehicle during the pyrolysis; or (iv) any combination of (i)-(iii).

15. The method of claim 1, wherein pyrolyzing the solid-state mixture prepares an intermediate crystallite having a lower conductivity than the $Li_7La_3Zr_2O_{14}$, and wherein the method further comprises processing the intermediate crystallite via: (i) heat treating; (ii) densification; (iii) annealing; (iv) sintering; or (v) any combination of (i)-(iv), to yield the $Li_7La_3Zr_2O_{14}$.

16. The method of claim 15, comprising densifying the intermediate crystallite via pressing at a pressure of 5 MPa and temperature of 80° C. to yield the $Li_7La_3Zr_2O_{14}$.

17. The method of claim 15, comprising heating the intermediate crystallite to a temperature of from 850 to 1000° C. to yield the $Li_7La_3Zr_2O_{14}$.

18. The method of claim 1, wherein the $Li_7La_3Zr_2O_{14}$: (i) exhibits a lattice conductivity of at least $4.5 \times 10^{-5}$ S cm$^{-1}$; (ii) exhibits a bulk conductivity of at least $5 \times 10^{-4}$ S cm$^{-1}$; or (iii) both (i) and (ii).

19. The method of claim 1, wherein the $Li_7La_3Zr_2O_{14}$: (i) is substantially phase pure; (ii) exhibits a crystallite size of at least 150 nm; or (iii) both (i) and (ii).

* * * * *